United States Patent [19]

Miyao

[11] Patent Number: 4,710,918
[45] Date of Patent: Dec. 1, 1987

[54] COMPOSITE DATA TRANSMISSION SYSTEM

[75] Inventor: Fumio Miyao, Ebina, Japan
[73] Assignee: Fuji Xerox Co., Ltd., Tokyo, Japan
[21] Appl. No.: 841,543
[22] Filed: Mar. 19, 1986

[30] Foreign Application Priority Data

Mar. 20, 1985 [JP] Japan .................................. 60-57166

[51] Int. Cl.$^4$ .............................................. H04J 3/24
[52] U.S. Cl. ........................................ 370/85; 370/94
[58] Field of Search ................... 370/85, 60, 94, 89; 340/825.5

[56] References Cited

U.S. PATENT DOCUMENTS

| | | | |
|---|---|---|---|
| 4,332,027 | 5/1982 | Malcolm | 370/94 |
| 4,412,326 | 10/1983 | Limb | 370/85 |
| 4,435,804 | 3/1984 | Tan | 370/69.1 |
| 4,494,231 | 1/1985 | Slawy et al. | 370/60 |
| 4,502,137 | 2/1985 | Tan | 370/85 |
| 4,507,778 | 3/1985 | Tan | 370/94 |
| 4,510,600 | 4/1985 | Tan | 370/94 |
| 4,516,240 | 5/1985 | Kume et al. | 370/85 |
| 4,525,832 | 6/1985 | Miyao | 370/85 |
| 4,525,837 | 6/1985 | Tan et al. | 370/85 |
| 4,539,676 | 9/1985 | Lucas | 370/60 |
| 4,569,041 | 2/1986 | Takeuchi et al. | 370/60 |
| 4,592,048 | 5/1986 | Beckner et al. | 370/60 |

FOREIGN PATENT DOCUMENTS

WO83/00788 3/1983 PCT Int'Appl. .

*Primary Examiner*—Douglas W. Olms
*Assistant Examiner*—Frank M. Scutch, III
*Attorney, Agent, or Firm*—Kinney & Lange

[57] ABSTRACT

A composite data transmission system wherein packet switching stations adapted to transmit data of the kind for which transfer delay and periodicity do not matter and operated to detect collisions between packets in the light of alterations in the DC voltage level of packet signals and circuit switching stations adapted to transmit data of the kind requiring periodic transmission are connected to one and the same transmission line, which composite data transmission system is characterized by causing DC voltage signals of a fixed magnitude to flow with prescribed periods through the transmission line thereby enabling the packet switching stations to recognize collisions and permitting the circuit switching stations to exchange communication during the existence of the packet switching stations' recognition of collisions and permitting the packet switching stations to exchange communication during the absence of the DC voltage signals' flow.

5 Claims, 13 Drawing Figures

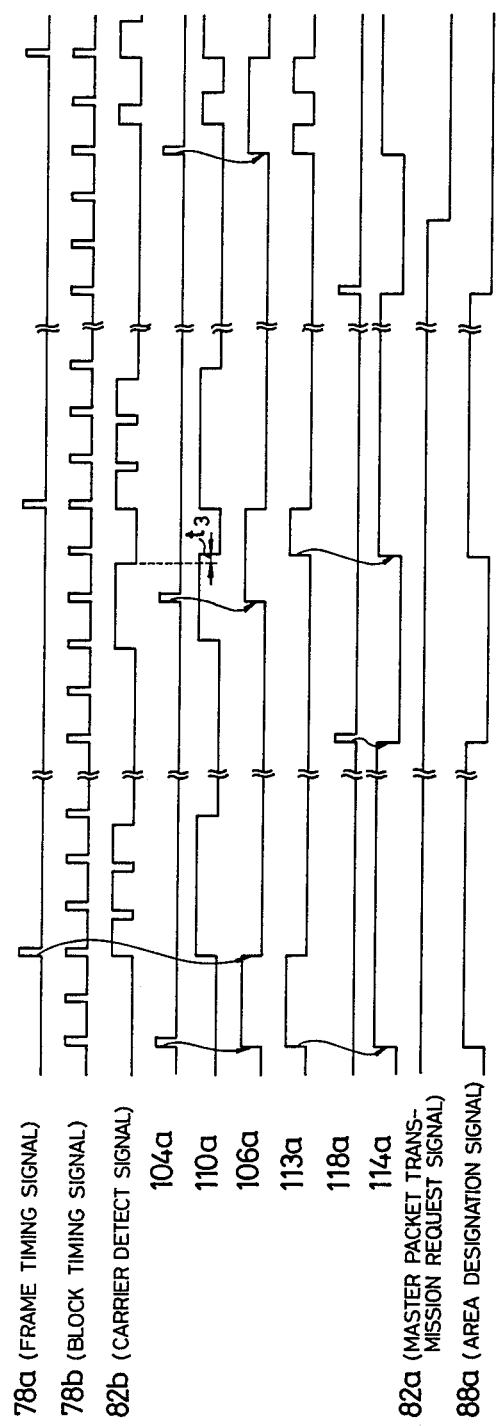
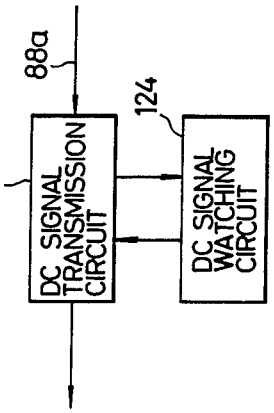
FIG. 3
FIG. 4
78a (FRAME TIMING SIGNAL)
78b (BLOCK TIMING SIGNAL)
82b (CARRIER DETECT SIGNAL)
104a
110a
106a
113a
118a
114a
82a (MASTER PACKET TRANS-
MISSION REQUEST SIGNAL)
88a (AREA DESIGNATION SIGNAL)

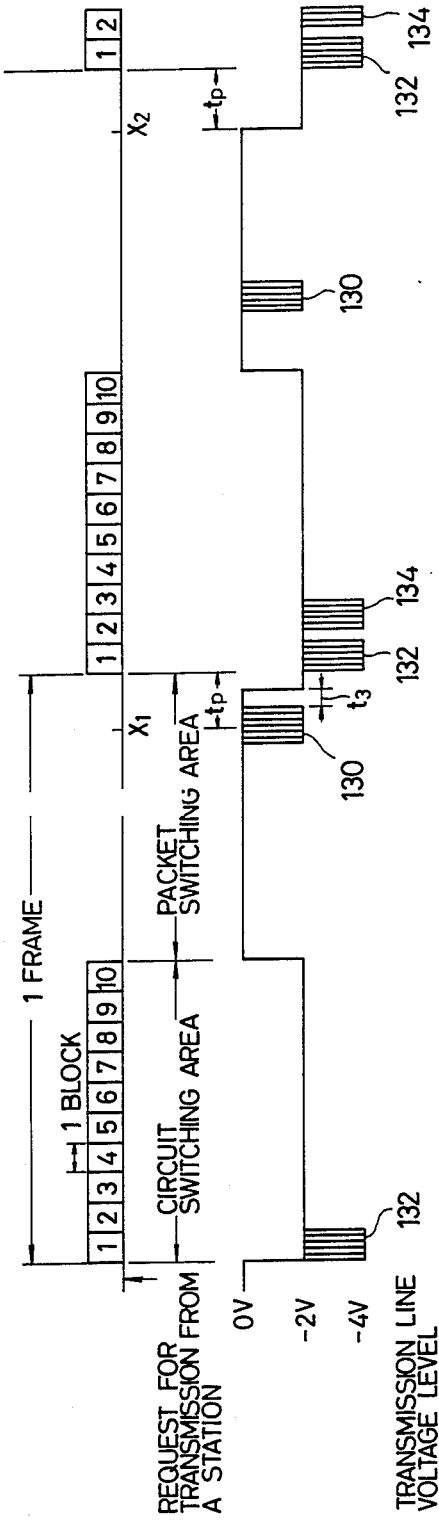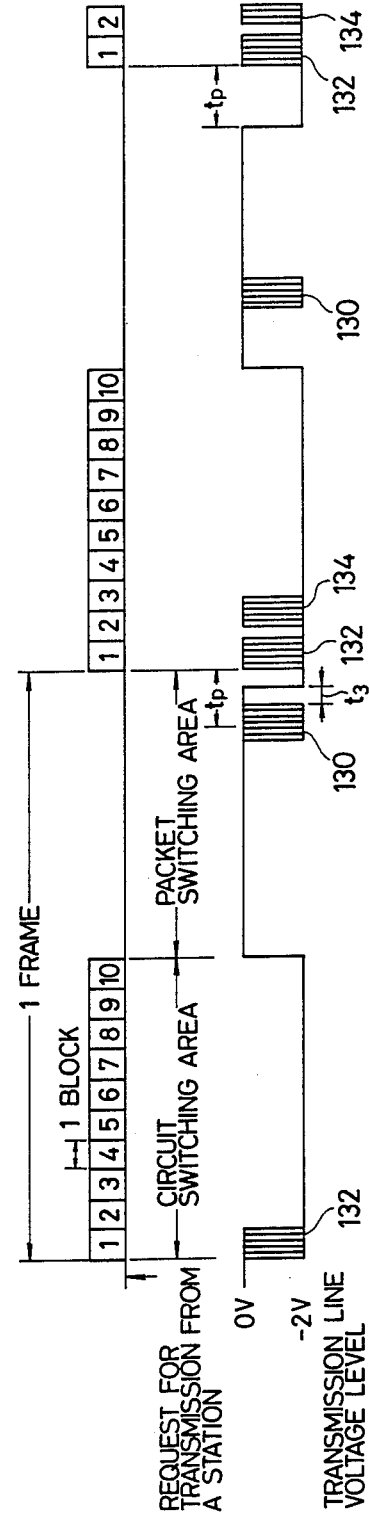

COMPOSITE DATA TRANSMISSION SYSTEM

FIELD OF THE INVENTION

This invention relates to a composite data transmission system for effecting rapid transfer of data within a given building lot by means of a coaxial cable, for example, distributed in the building lot.

DESCRIPTION OF THE PRIOR ART

As one form of the local area network (LAN) designed for effecting transmission and reception of data among a plurality of stations interconnected with one common transmission line, the "Ethernet" resorting to the concept of buses has found widespread recognition. In this particular LAN, messages divided into data blocks each of some thousands of bits are transmitted. The messages are prefixed by various headers including receiver's address, transmitter's address, and control signal.

The LAN is a passive transmission medium such that the network itself has no controlling function of any sort and the control is wholly apportioned among the member stations of the network. Thus, the LAN utilizes the transmission control method called "Carrier-Sense Multiple Access/ Collision-Detection (CSMA/CD)" whereby each member station, on perceiving a vacancy in the transmission line, gains access to a channel and starts transmitting a message to other member station to be selected and, when any of the packets carrying the message collides with other packet from any other member station, the member stations starting the transmission suspend the transfer of data and, after elapse of a random waiting time, try to resume the transfer of the message.

The method of data transfer just described may be called a packet-switch type LAN.

The method by which the transmission of packets is controlled in the packet-switch type LAN will be described in detail below with reference to the accompanying drawings. FIG. 7 depicts a case in which no collision has occurred between packets. When an S station receives a request for transmission as from a terminal, the transmission control circuit of this station first checks the transmission line and confirms whether or not any transmitted signal exists on the transmission line. In the condition of FIG. 7, since the transmission line is empty, the S station immediately starts sending out packets. When a request for transmission occurs at a C station while the S station is in the process of transmitting packets, the transmission control circuit of the C station checks the transmission line and confirms the presence or absence of signal on the transmission line. At this time, since the transmission line has a signal on it, the C station waits until the S station completes the transmission of packets. When the C station detects completion of the S station's transmission of packets, it starts transmitting packets after elapse of a certain waiting time, $t_1$. Similarly, when a request for transmission occurs at an $R_1$ station, the presence or absence of a signal on the transmission line is checked and the transmission of packets is effected, depending on the condition prevalent at that time.

FIG. 8 depicts a case in which collision between packets has occurred on the transmission line. It is assumed that a request for transmission is received by the S station similarly to the case of FIG. 7. At this time, since the transmission line is empty, the S station starts transmitting packets. When a request for transmission occurs at the C station and the $R_1$ station while the S station is in the process of transmitting packets, since the packet from the S station exists on the transmission line, the C station and the $R_1$ station start watching for completion of the transmission of packets by the S station. The C station and the $R_1$ station, on detecting the completion of the S station's packets, start transmitting packets after elapse of the waiting time, $t_1$, without checking the presence or absence of a signal on the transmission line. On the transmission line, therefore, there automatically ensues a collision of the packet from the C station and that from the $R_1$ station. The C station and the $R_1$ station, on detecting this collision, send out collision enforcing signals of a prescribed length and then stop transmitting signals. Subsequently, they effect retransmission in accordance with the retransmission control method called "Binary Exponential Back-off (BEB)."

Now, the packet switching stations of this packet switching type LAN will be explained. The packet switching station, on receiving a request for transmission, sends out packets only after it has checked the transmission line and confirmed the absence of a signal on the transmission line as already described above. Specifically, when it recognizes the presence of a signal on the transmission line, it postpones the transmission of packets until the signal on the transmission line ceases to exist. This detection of the presence or absence of a signal on the transmission line is effected as follows.

FIG. 9 is a functional block diagram of the packet switching station. In this diagram, a received signal on the transmission line 2 is fed in a receive circuit 4 and a transmission-line DC level judging circuit 6. The signal which has entered the receive circuit 4 undergoes waveform regulation and then is forwarded to a receive logical circuit 8. In the receive logical circuit 8, the received signal is decoded and the resulting data are transferred to a receive buffer memory 10. The control signal in the received packet is forwarded to a transmission control circuit 12. At the same time, the received signal is sent to a carrier detect circuit in the transmission control circuit 12.

FIG. 10 depicts is a block diagram of the carrier detect circuit. The carrier detect circuit, as illustrated in the diagram, comprises a first transition detection circuit 40 for admitting the receive signal, a second transition detection circuit 42, for admitting a collision detection signal from a collision signal generating circuit 16, and an OR circuit 44 for computing a logical sum of the outputs of the first and second transition detection circuits 40, 42. The carrier detect signal, therefore, is turned ON when either or both of the receive signal and the collision detection signal are injected.

With reference again to FIG. 9, the transmission control circuit in the transmission control circuit 12, on receiving a request for transmission from a terminal control device 14, is enabled to determine whether the transmission line 2 is now in use or not by perceiving the existing status of the carrier detect signal which is an output of the carrier detect circuit.

Now, the manner in which the collision detection signal entering the carrier detect circuit is produced will be described below. In the pattern of FIG. 9, the detection of a collision is attained by imparting a DC component to the transmission signal sent out to the transmission line 2 and checking the average DC level on the transmission line.

The signal flowing to the transmission line 2 is formed of Manchester codes as illustrated in FIG. 11. The Manchester code system represents the bit "0" of the NRZ (Nonreturn to Zero) signal as "1,0" and the bit "1" thereof as "0,1" so that even when several 0's or several 1's occur in a row, the ratio of the averaged H level to the L level will be 50%. When the H level of the outgoing Manchester signal directed to the transmission line is DC offset to 0 V and the L level to −2 V, for example, the average DC level on the transmission line remains at −1 V during the presence of a packet.

The DC loop resistance of the coaxial cable of the transmission line 2 is about 5 Ω at most per segment (500 m) and the variation of the DC voltage level due to the position on the cable, therefore, is very slight. The average DC voltage level of the transmission line is −1 V while only one station is sending out packets and the average DC voltage level is below −2 V when a collision occurs between packets being sent out by two or more stations.

Detection of this collision, therefore, is attained by passing the received signal through a low pass filter thereby expelling the signal component and picking out only the DC component and comparing the DC component with a reference value such as, for example, −1.5 V which falls somewhere between −1 V and −2 V.

With reference to FIG. 9, when the transmission line DC level judging circuit 6 detects a collision as described above, it triggers the collision signal generating circuit 16. The triggered collision signal generating circuit 16 sends out a collision detection signal to the relevant device of the station by way of displaying the occurrence of a collision.

In FIG. 9, 18 stands for a data transmitter, 20 for a data receiver, 22 for a transmission buffer memory, 24 for a transmission logical circuit, 26 for a transmission clock generator, 28 for a transmission circuit, 30 for a transmission signal watching circuit, and 32 for a transmission signal DC level setting circuit. These circuits are well known in the art and will be described in detail afterward with reference to FIG. 1. A further description of these circuits, therefore, will be omitted here.

As is clear from the description given above, the packet switching type LAN permits its member stations to start transmitting data at any time freely selected and, as the result, has the possibility that packets from different stations will collide. In the LA.N, therefore, the frequency of occurrence of collisions increases, the number of chances of repeating transmission grows, and the speed of transfer of data slows down in proportion as the transmission line gains in congestion. This LAN, as a natural consequence, suffers from the disadvantage that the delay time in the transmission of data cannot be fixed. Thus, it does not suit the real time transmission which greatly cherishes the relation of exchange of transmission and reception on the real-time axis such as in the conversational voice communication.

A version of LAN improved to eliminate the drawback described above has been proposed (Japanese patent application SHO No. 56(1981)-38,714). In the improved LAN, the frames periodically repeated on the time axis are each divided into a plurality of blocks on the time axis so that the member stations will be given a chance of effecting packet communication by utilizing such blocks as a unit.

The member stations, therefore, are vested with equality in the use of vacant blocks. When one member station occupies a prescribed block over a length of time required for transmission of signals, it is periodically given chances of signal transmission each time frames are repeated. Thus, the real-time transmission is materialized.

The data transmission system described above may well be called a circuit switching type LAN. The circuit switching type LAN will be described in detail below with reference to drawings.

One typical frame configuration for the signals to be used in the aforementioned circuit switching type LAN is illustrated in FIG. 12.

Each of the frames which are repeated periodically on the time base consists of N blocks (#1 through #N). And each of the blocks consists of various bit rows, $b_1$ through $b_9$, as shown below.

$b_1$ ... Rear guard time
$b_2$ ... Preamble
$b_3$ ... Address field
$b_4$ ... Distance code field
$b_5$ ... Control field
$b_6$ ... Data field
$b_7$ ... Frame check sequence (FCS) field
$b_8$ ... End flag
$b_9$ ... Front guard time The bit rows $b_2$ through $b_5$ and the bit rows $b_7$ and $b_8$ are essential components for a packet. These bit rows are collectively referred to as "overhead bits". The two bit rows, $b_1$ and $b_9$, are collectively referred to as the "guard time".

The term "guard time" means "empty bit rows" which are intended to preclude the situation in which packets in adjacent blocks may possibly be caused to overlap, if partially, owing to the delay time which occurs during the propagation of signals on a coaxial cable.

In the bit rows forming this guard time, the rear guard time $b_1$ serves to protect the trailing one of any two adjacent packets against the trouble of overlapping and the forward guard time $b_9$ similarly to protect the leading packet against the trouble.

The sum of the number of bits of the rear guard time $b_1$, and that of bits of the front guard time $b_9$, will be represented as g bits and the guard time ($b_1 + b_9$) will be represented hereinafter as $\tau(g)$.

In the digital signal transmission system proposed as described above, when none of the personal stations in the system is transmitting signal, all the personal stations have a chance, equally and at any time at all, to start sending out signals in the aforementioned frame configuration. Thus, the particular personal station which is the first to start sending out signal onto the transmission cable will take the initiative in the synchronization of frames.

Once the frame synchronization has been established as described above, all the personal stations are enabled to keep watch on the state of signals being transmitted on the transmission cable.

As will be described fully afterward, the transmission control circuit at the personal stations are each provided with a memory adapted to memorize the condition of occupation of individual blocks by signals in the frames. Thus, all the personal stations are allowed to register relevant blocks based on the incoming packet signals addressed to themselves.

After the particular personal station has established the frame synchronization, any of the other personal stations is allowed to send out packet signals by selecting empty blocks based on the information stored in the aforementioned memory and loading these empty blocks with packet signals desired to be transmitted.

In this case, the timing by which the personal stations are allowed to send out their own packet signals poses a problem.

For the sake of explanation, let us assume that, as illustrated in FIG. 13, a coaxial cable 3 has its opposite ends connected to impedance matching terminators 1 and 1a, a personal station C is located at the middle point of the coaxial cable 2, and a personal station S located between the personal station C and the terminator 1 is already in the process of transmitting signals on the coaxial cable 3.

In this case, the packet signals which are being sent out by the personal station S are received by the personal station C and the other personal stations, $R_1$ through $R_4$, on the coaxial cable 3 at different points of time, depending on the variation in the signal propagation delay time on the cable 2.

If the personal stations randomly send out their own signals without paying any respect to the other personal stations, then there is a fair possibility that the packets issuing from such personal stations will overlap (collide with) each other on the coaxial cable 3.

For the purpose of precluding this detestable phenomenon, the aforementioned signal transmission system makes effective use of the aforementioned concept of guard time $\tau(g)$, in establishing the synchronization of system timing.

To be more specific, in this signal transmission system, the guard time $\tau(g)$, is fixed at two or more times of the signal propagation delay time required to cover the distance between the centrally located personal station C, datum position, and the most distant personal station and the transmission of signals is effected so that, at the receiving point of the centrally located personal station C, the packets issuing from the individual personal stations will be arranged as separated by equal intervals.

This system utilizes the transmission line of the so-called circuit switching type and proves suitable for protracted periodic flow of data such as vocal or pictorial data or for transmission of massive data. It, however, proves highly inefficient for transmission of small volumes of data which are generated with random time intervals as between computers or between a computer and its terminal devices.

As described above, the packet switching type LAN is suitable for transmission of such data as computer data which are generated with random time intervals and is unsuitable for the real-time transmission of vocal or pictorial data which profoundly cherishes the relation of exchange of transmission and reception. In contrast, the circuit switching type LAN is not suitable for transmission of the data of the former kind but is suitable for transmission of the data of the latter kind.

An attempt to obtain efficient transmission of the two kinds of data described above, therefore, has entailed the disadvantage that one transmission line must be selectively used at times for one of the two kinds of data and at other times for the other kind of data to be actually used for communication or two or more transmission lines must be laid for the two kinds of data.

SUMMARY OF THE INVENTION

An object of this invention is to use one transmission line on the time-shared basis for the two transmission modes (i.e. the circuit switching mode and the packet switching mode) and thereby enable a given set of data to be rapidly and efficiently transmitted in the mode fitting the kind of data being handled.

Another object of this invention is to realize the time-shared use of one transmission line mentioned above in the existing transmission system of the packet switching mode (namely, the packet switching type LAN) without alteration therein.

To be specific, this invention is directed to a composite data transmission system wherein packet switching stations adapted to transmit data of the kind for which transfer delay and periodicity do not matter and operated to detect collisions between packets in the light of alterations in the DC voltage level of packet signals and circuit switching stations adapted to transmit data of the kind requiring periodic transmission are connected to one and the same transmission line, which composite data transmission system is characterized by causing DC voltage signals of a fixed magnitude to flow with prescribed periods through the transmission line thereby enabling the packet switching stations to recognize collisions and permitting the circuit switching stations to exchange communication during the existence of the packet switching stations' recognition of collisions and permitting the packet stations to exchange communication during the absence of the DC voltage signals' flow.

BRIEF DESCRIPTION OF THE DRAWINGS

FIG. 3 is a time chart of signals in the essential part of FIG. 2.

FIG. 4 is a detailed block diagram of an area signal generating circuit illustrated in FIG. 1.

FIG. 5 is a diagram illustrating one condition of transmission signal on the transmission line in the embodiment under discussion.

FIG. 6 is a diagram illustrating another condition of transmission signal on the transmission line.

DETAILED DESCRIPTION OF THE INVENTION

Figure 1:
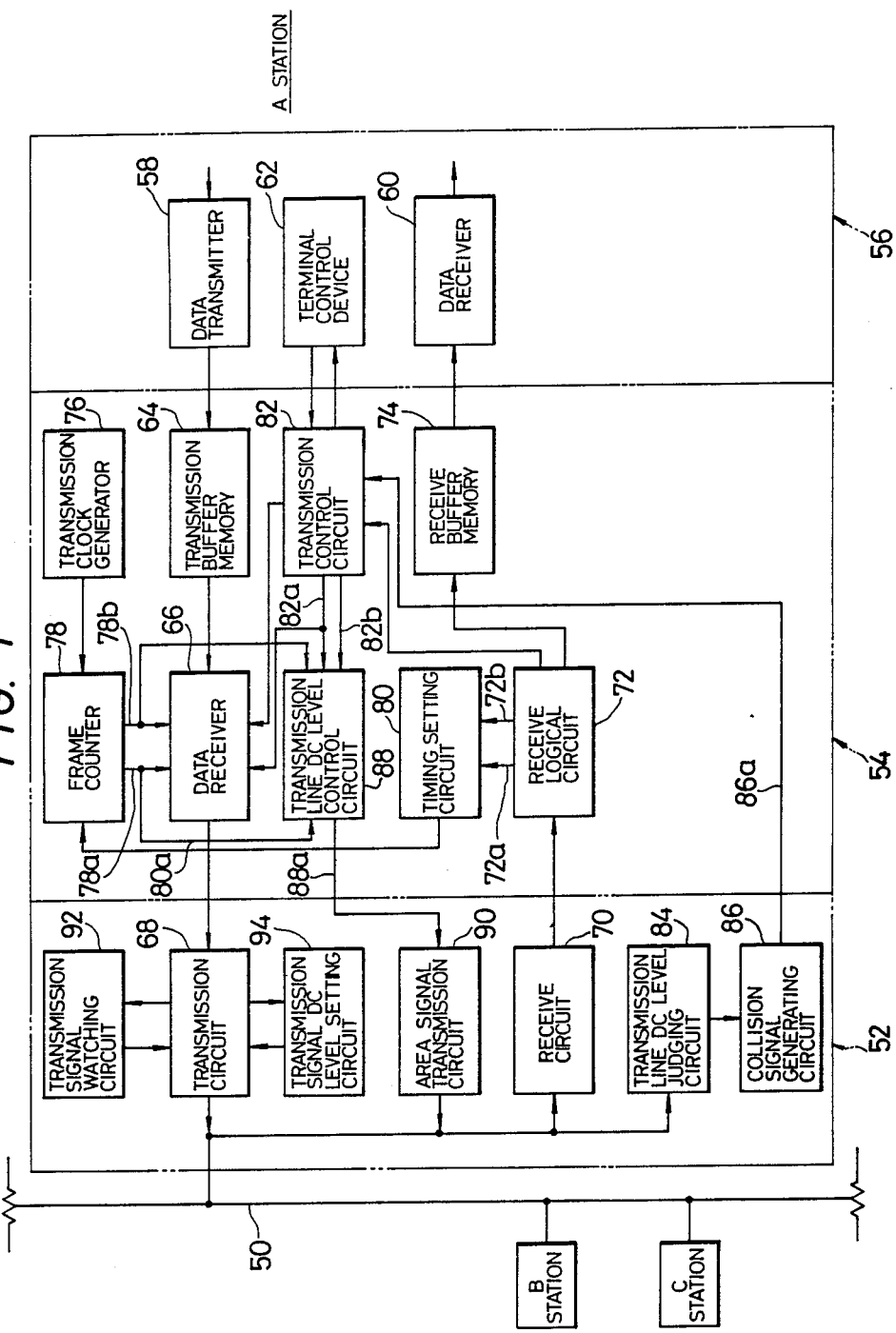
FIG. 1 is a block diagram of a typical circuit switching station embodying the present invention to be used for realizing a hybrid transmission mode which effects the circuit switching mode and the packet switching mode in one and the same transmission line.

Now, the present invention will be described in detail below with reference to a working example.

In this working example, the transmission line is utilized as time-shared between a circuit switching area and a packet switching area to permit combined use of the two modes of transmission, i.e. the packet switching mode and the circuit switching mode, on one and the same transmission line. In other words, part of the time-shared frames are allocated to the packet switching area in the circuit switching system.

In this case, since the circuit switching type transmission mode inherently makes use of the transmission line on the time-shared basis, adoption of a uniform set of rules permits easy distinction between the circuit switching area and the packet switching area. The question is what method there is which enables the existing packet switching type station devoid of such time-sharing function to make a distinction between these areas.

The present working example has coped with this question as follows. As described in the former section introducing prior art, the packet switching station judges whether the transmission line 2 is now in use or not by checking the status of the carrier detect signal which is the output of the carrier detect circuit in the transmission control circuit 12.

The carrier detect signal, therefore, is used for the purpose of enabling the packet switching station to discern the fact that the transmission line constitutes the circuit exchanging area, i.e. the fact that the packet switching station is not in a status capable of sending out any packet.

If, in this case, the carrier detect signal is turned ON by giving a transmission signal to the transmission line 2, the transmission signal from the station currently using the circuit switching area mingles with the signal used for area distinction, rendering transfer of data infeasible. The present working example, therefore, contemplates turning ON the carrier detect signal by giving a DC signal to the transmission line 2.

To be specific, this operation is effected as follows. When the transmission of signals is made by using the Manchester codes fixing the H level at 0 V and the L level at −2 V as described previously, the average DC level on the transmission line 2 falls at −2 V when a collision occurs between signals. The transmission line 2 and the transmission line DC level judging circuit 6 are interconnected with DC. When the reference voltage for detection of a collision, a DC signal of a magnitude of not more than −1.5 V in this case, is applied to the transmission line 2, the function of collision detection is put to effect. Consequently, the collision detection signal for injection into the carrier detect circuit is turned ON and the carrier detect signal is also turned ON. As the result, the packet switching station is prohibited from sending out packets. In the arrangement described above, separation between the circuit switching area and the packet switching area can be attained by switching the DC level on the transmission line.

FIG. 1 schematically depicts the LAN which realizes the composite data transmission system (hybrid transmission system) of the present working example for performing the circuit switching mode and the packet switching mode on one and the same transmission line.

The member stations A, B, C, . . . are independently connected through the medium of a transceiver 52 to a coaxial cable 50. In the present working example, these stations A, B, C, . . . comprise circuit switching stations and packet switching stations.

Figure 9:
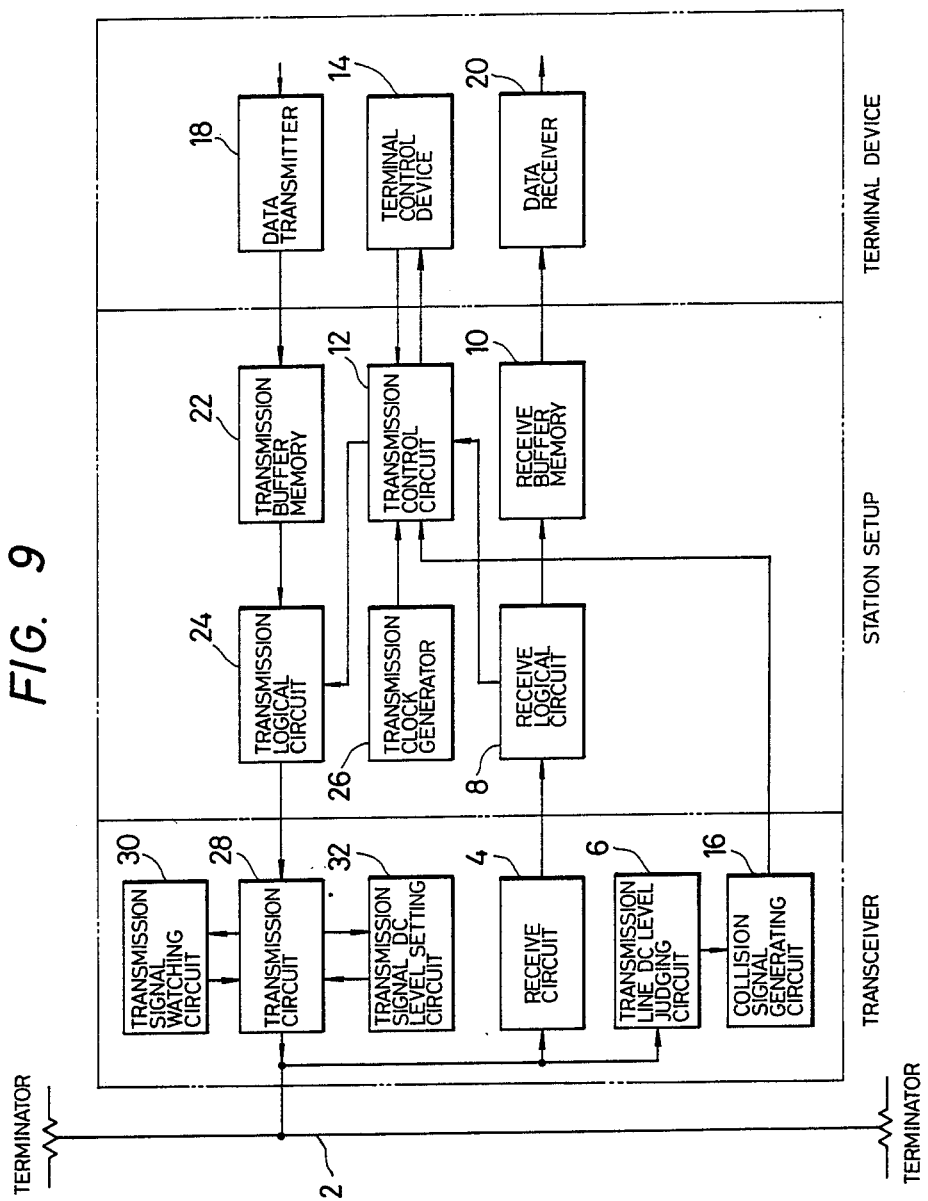
FIG. 9 is a block diagram of the conventional packet switching station.
Figure 10:
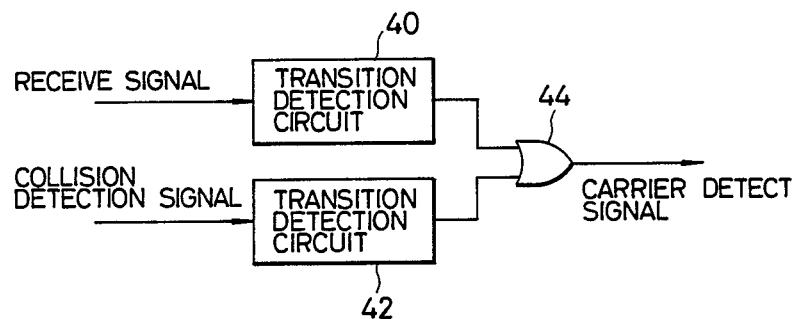
FIG. 10 is a block diagram of a carrier detect circuit.

The packet switching stations may use the station setup (FIG. 9) described in the former section on prior art. The circuit switching stations may use the setup of the A station illustrated in FIG. 1. Since the existing station setups can be used as the packet switching stations without alteration and the circuit switching stations are obtained by altering the existing station setups. Now, therefore, with attention focussed on the circuit switching station A, the construction and operation of this particular station will be described below.

As is plain from FIG. 1 illustrating the A station as a representative, each of the circuit switching stations is provided with a terminal device 56 incorporating therein a computer and a telephone set. The terminal device 56 comprises a data transmitter 58 for transmitting digital signals of packet units to other member stations, a data receiver 60 for receiving digial signals of packet units sent from other member stations, and a terminal control device 62 for controlling terminals. The signals issued from the data transmitter 58 are temporarily stored in a transmission buffer memory 64. The siganls are subsequently read out collectively at fixed intervals with clock signals equalling the transmission speed on the coaxial cable 50 as the medium of transmission. The signals so read out are converted by a transmission logical circuit 66 into fixed packet signals. Then, the packet signals are passed through a transmission circuit 68 within the transceiver 52 and sent out onto the coaxial cable 50.

In the meantime, the packet signals issued from the member stations are invariably passed through the coaxial cable 50 and received by a receive circuit 70 within the transceiver 52. The output signals from the receive circuit 70 are forwarded to a receive logical circuit 72 within the station setup 54. The receive logical circuit 72 selects only the packet signals addressed to the own station out of all the packet signals received and puts the selected packet signals to temporary storage in a receive buffer memory 74. By the data receiver 60, the signals so stored are continuously read out with stated clocks. Thus, reception output signals are obtained.

The transmission and reception of signals are carried out as described above. The transmission clocks to be used for the transmission and reception are issued from a transmission clock generator 76. A frame counter 78 serves to divide the transmission clocks and produce frame timing signals 78a and block timing signals 78b for designating the frame timing.

In the meantime, the receive logical circuit 72 extracts master station distance code transmission signals 72a and master packet reception timing signals 72b from the packet signals sent from the particular member station establishing the system timing and forwards the extracted signals to a timing setting circuit 80. This timing setting circuit 80 produces frame resetting signals 80a based on the incoming signals 72a, 72b and sends out the produced signals 80a to the frame counter 78 in an effort to synchronize the system timing. Since the synchronization of the system timing has no direct bearing on this invention, any further description thereof will be omitted.

A transmission control circuit 82 controls the terminal control device 62 based on the reception signals addressed to the own station from the transmission logical circuit 72 and, at the same time, controls the reception logical circuit 66 in accordance with the command from the terminal control device 62. A transmission line DC level judging circuit 84 keeps watch on the average DC level on the transmission line, detects any collision between packets and between DC signals, triggers a collision signal generating circuit 86 and causes it to generate a collision detection signal 86a, and notifies the transmission control circuit 82 of the occurrence of this collision.

A transmission line DC level control circuit 88, when the packet transmission control signal from the transmission control circuit 82 designates a master packet transmission request signal 82a, sends to an area signal transmission circuit 90 in the transceiver 52 an area designation signal 88a which indicates that the transmission line currently constitutes a circuit switching area.

A transmission signal watching circuit 92 keeps watch on the transmission circuit 68 with respect to issuance of abnormal signal to the transmission line and, on detecting the issuance of abnormal signal, shuts down the transmission circuit 68 and protects the transmission line against interference by the abnormal signal. A transmission signal DC level setting circuit 94 applies a DC offset to the signals formed of Manchester codes.

Now, typical construction and operation of the transmission DC level control circuit 88 mentioned above will be described in detail below with reference to FIG. 2 and FIG. 3.

Figure 2:
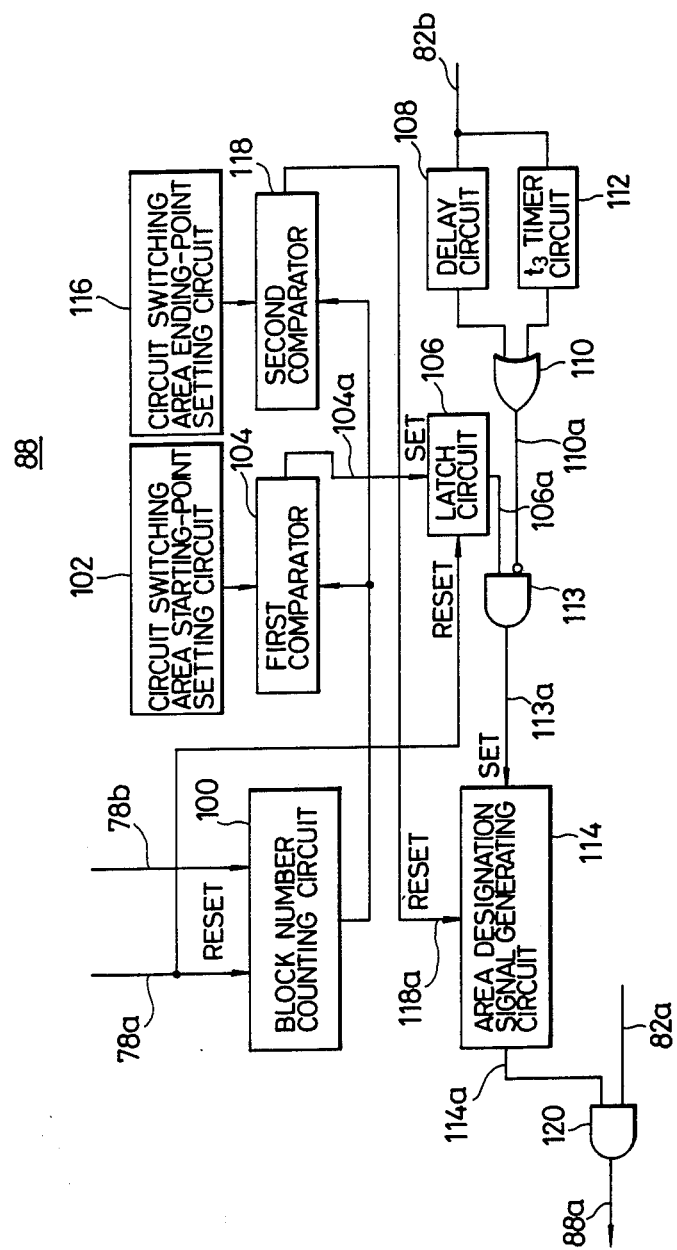
FIG. 2 is a detailed block diagram of a transmission line DC level controlling circuit illustrated in FIG. 1.
Figure 7:
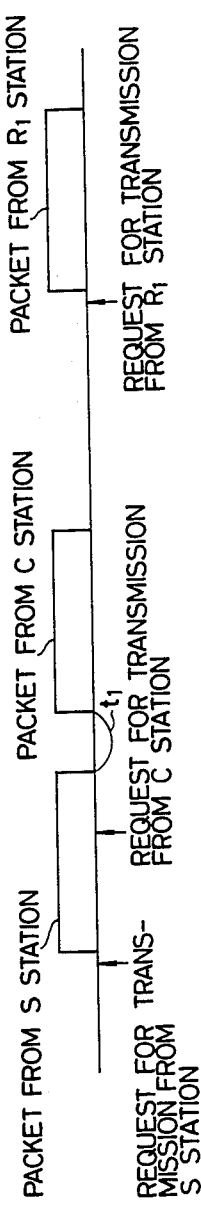
FIG. 7 and FIG. 8 are explanatory diagrams of the mode of control of the transmission of packets in the conventional packet switching LAN.
Figure 8:
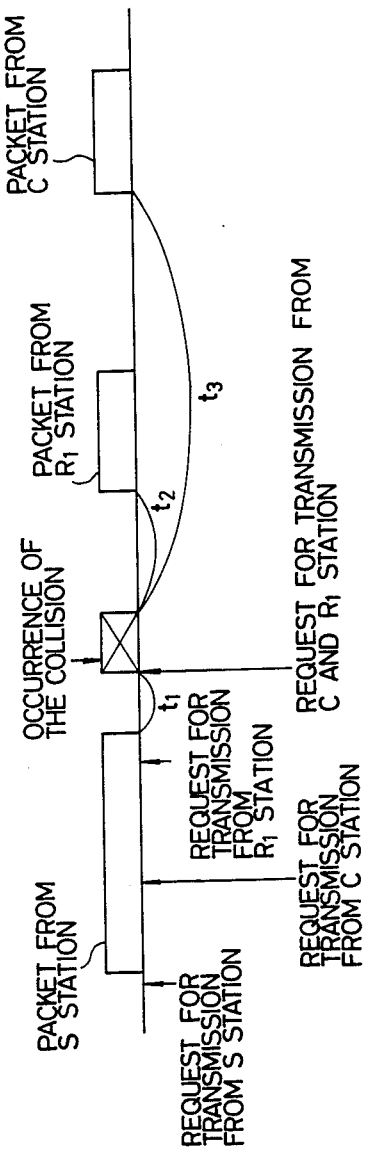

FIG. 2 is a block diagram and FIG. 3 is a time chart of the signals in the essential part of the circuit of FIG. 2.

As illustrated in FIG. 2, a block number counting circuit 100 is reset by the frame timing signal 78a brought in from the frame counter 78. Then, it keeps on counting the block timing signal 78b. When the count increases and equals the value set in advance in a circuit switching area starting-point setting circuit 102, a first comparator 104 feeds out an output signal 104a. By this signal 104a, a latch circuit 106 is set to cause a rise of the signal 106a. This latch is reset by the frame timing signal 78a and the signal 106a is turned OFF.

Then, when the carrier detect signal 82b is injected, this signal 82b is passed through a delay circuit 108 and is supplied, with a delay, to an OR circuit 110. The signal 82b is also fed to a $t_3$ timer circuit 112.

The $t_3$ timer circuit 112 is excited by a fall in the carrier detect signal 82b to issue a signal which is kept ON for the duration of $t_3$. The logical sum (OR) of the output of the $t_3$ timer circuit 112 and the output of the delay circuit 108 is manifested as a signal 110a. Then in an AND circuit 113, the logical multiply (AND) of the inversion of this signal 110a and the signal 106a is manifested as a signal 113a.

This signal 113a is fed out in its unaltered form in the absence of the carrier detect signal 82b when the signal 106a is turned ON. In the presence of the carrier detect signal 82b, the signal 113a is turned ON after elapse of the duration of $t_3$ from the time at which the carrier detect signal 82b is turned OFF. The signal 113a is injected into an area designation signal generating circuit 114 to turn a signal 114a ON.

In the meantime, the block number counting circuit 100 is still counting block timing signals 78b. When the total of the count equals the value set in advance in a circuit switching area ending-point setting circuit 116, a second comparator 118 is actuated to issue a signal 118a. This signal 118a is injected into the area designation signal generating circuit 114 to reset the circuit 114 and turn OFF the signal 114a.

In an AND circuit 120, the logical multiply of this signal 114a and the master packet transmission signal 82a is produced and manifested as an area designation signal 88a. The master packet transmission request signal 82a is a signal which is kept ON only while the own station constitutes a master station.

A concrete example of the area signal transmission circuit 90 mentioned above is illustrated in FIG. 4. This area signal transmission circuit 90 is composed of a DC signal transmission circuit 122 for admitting area designation signals 88a and a DC signal watching circuit 124.

The DC signal transmission circuit 122 can be materialized with the same drive means as used in the conventional transmission circuit. The DC signal watching circuit 124 keeps watch as on the DC signal transmission circuit 122 to confirm that the issuance of DC signals for area designation is not caused by some trouble or other to continue for a period exceeding the stated duration. If the circuit 124 detects any excessively long issuance of the DC signals, it turns OFF the DC signal transmission circuit 122 and stops the issuance of DC signals from the circuit 122.

A typical division of areas on the transmission line by the use of the system configuration described above is illustrated in FIG. 5. When none of the circuit switching stations are exchanging data on the transmission line, the packet switching stations described in the former section on prior art are free to exchange data.

When, in this case, the terminal control device 62 of the terminal device 56 in the circuit switching station A issues a request for transmission, this request signal is conveyed to the transmission control circuit 82 of the station setup 54. The transmission control circuit 82, on receiving this request signal, is enabled to judge whether any of the circuit switching stations is currently engaging in transmission of data or not by examining the condition of registration in a memory which is incorporated, although not shown in the diagram, in the transmission control circuit 82.

When none of the circuit switching stations is not transmitting packet signals, the transmission control circuit 82 sends out master packet transmission designating signals 82a to the transmission logical circuit 66 and the transmission line DC level control circuit 88. When the transmission line DC level control circuit 88 receives the master packet transmission designating signal 82a, it refers to the frame timing signal 78a from the frame counter 78 and secures an area designation signal 88a for designation of the circuit switching area from the first part of the next frame and sends it to the area signal transmitting circuit 90 in the transceiver 52.

Consequently, the area signal transmitting circuit 90 feeds out an area signal, the transmission line (coaxial cable 50) has its DC level fixed at $-2$ V, and the transmission logical circuit 66 issues a master packet. When the master packet is issued successfully, the A station assumes the leadership of system timing. Here, the station which has assumed the leadership of system timing will be called as a "master station."

The transmission line DC control circuit 88 of the master station which has succeeded in issuing the first master packet sends to the area signal transmission circuit 90 the area designation signal 88a (10 blocks in volume in the present working example) indicating that the transmission line now constitutes the circuit switching area during the period to be designated by the circuit switching area starting-point setting circuit 102 and the circuit switching area ending-point setting circuit 116 inside the own circuit 88.

When the packet switching area of the present frame ends and the circuit switching area of the next frame begins, the transmission line DC level control circuit 88 keeps watch on the transmission line for the time, tp, the maximum packet length $t_1$ allowed for the station accommodated in the packet switching area plus the allowance bit length $t_2$, (i.e. $tp=t_1+t_2$) as shown in FIG. 5, before it sends out the master packet. This watching of the packet switching area is effected through observation of the carrier detect signal 82b issued from the transmission control circuit 82.

When the carrier detect signal is ON, namely the packet switching station transmitting packet 130 is on the transmission line, at the time $X_1$ at which the watch is started, the transmission line DC level control circuit 82b stands waiting until the carrier detect signal 82b is turned OFF. The area designation signal 88a is turned ON after elapse of the minimum packet interval $t_3$ of the packet switching station from the time at which the carrier detect signal 82b is turned OFF. As the result, the DC signal of the magnitude of $-2$ V is issued to the transmission line. The master station in which the packet from the packet switching station collides with the DC signal at the time that the DC signal is issued ignores the collision and keeps on issuing the area designation signal 88a. In the meantime, the packet switching station discontinues the issuance of packets and sends out the collision enforcing signal and resumes the issuance.

When the carrier detect signal is OFF at the time $X_1$ at which the watch is started, the area designation signal 88a is turned ON at that time and starts issuing the DC signal of the magnitude of $-2$ V to the transmission line. If the DC signal collides with the packet issued from the packet switching station, the same action as described above is effected.

Figure 11:
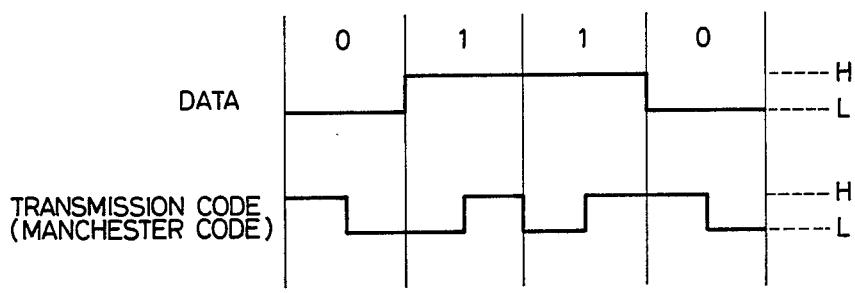
FIG. 11 is a waveform diagram illustrating the relation between the NRZ signal as the source of data and the transmission code signal (Manchester code signal) converted and flowing on he transmission line.
Figure 12:
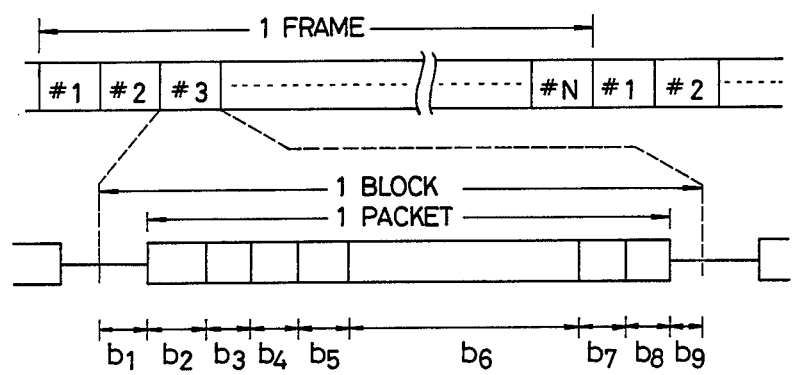
FIG. 12 is a frame structure diagram of signals on the circuit switching type LAN.
Figure 13:
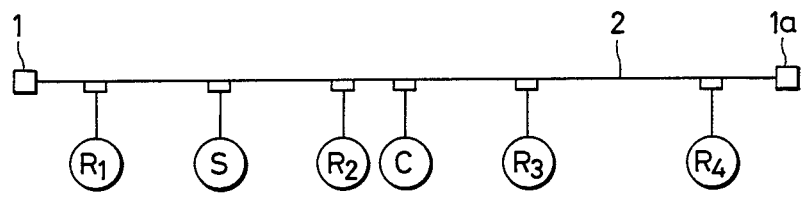
FIG. 13 is an explanatory layout diagram illustrating the condition of layout of member stations on a coaxial cable.

When any of the member stations is already exchanging communication in the circuit switching area at the time that the terminal control circuit 62 of the terminal device 56 in the circuit switching station issues a request for transmission, the presence of a vacant block is confirmed through examination of the condition of registration in the memory provided within the transmission control circuit 82 as already described and the issuance of data packets to that particular vacant block is started. The signal issued at this time is on the same level as the signal issued by the packet switching station, i.e. the level in the range of 0 to $-2$ V, and is formed of the transmission codes shown in FIG. 11.

The collision between packets from the circuit switching station which occurs when the block to be used is secured in the circuit switching area is rendered detectable by having the reference value of the transmission line DC level judging circuit 84 in the circuit switching station set at $-3.5$ V.

In the working example cited above, the area designation signal 88a has been described as having the transmission line voltage level thereof fixed at $-2$ V. This value is not critical. Further in the circuit switching area, the data signals are sent out at a voltage level smaller than the voltage level of the area designation signal, i.e. the fixed DC voltage level. The same effect, however, is obtained by issuing the data signal at a voltage level larger than the DC voltage level as illustrated in FIG. 6. In FIG. 6, the numerical symbols which have equivalents in FIG. 5 denote identical parts.

In the working example cited above, at the time that the circuit switching station starts issuing packet signals, the vacant block is selected by examing the condition of registration in the memory provided within the transmission control circuit 82 and this particular block is occupied for accommodation of packets to be issued. This operation may be carried out in the following mode instead.

The communication in the circuit switching area can be carried out by effecting communication with the master station by the use of the packet switching area and securing allocation of the circuit switching channel to be used (namely, a vacant block) from the master station as the reference station before the circuit switching station starts issuing packet signals. As the result, any member station wishing to issue packet signals is enabled to secure allocation of the circuit channel from the master station and the occurrence of collision within the circuit switching area can be precluded. In this case, the circuit switching station is required to combine the function of packet switching with the function of circuit switching.

In the mode in which the circuit switching channel to be used is allocated by the master station as described above, efficient use of the packet switching area is attained by increasing the circuit switching area whenever the circuit switching station issues a request for transmission and eliminating the channel of the circuit switching area from the next frame when termination of the communication of the particular member station using the trailing channel of the circuit switching are is detected.

Plainly from the desciption given above, the present invention brings about the following effects.

(1) Since signals for two transmission modes can be transmitted on one and the same transmission line, the data which are generated at random time intervals as the data for computers and the data such as vocal or pictorial data which cherish the relation of exchange of transmission and reception can be efficiently transmitted.

(2) The system can be readily and inexpensively materialized because the transmission system of the circuit switching mode can be incorporated in one and the same transmission line without any alteration to the transmission system of the existing packet switching mode.

What is claimed is:

1. A composite data transmission system wherein (i) packet switching stations adapted to transmit data of the kind for which transfer delay and periodicity do not matter and operated to detect collisions between packets in light of alterations in the DC voltage level of packet signals and (ii) circuit switching stations adapted to transmit data of the kind requiring periodic transmissions are connected to one and the same transmission line, which composite data transmission system is characterized by causing DC voltage signals of a fixed magnitude and prescribed periods to flow through said transmission line thereby enabling said packet switching stations to recognize collisions and permitting said circuit switching stations to exchange communication during the existence of said packet switching stations' recognition of collisions and permitting said packet switching stations to exchange communication during the absence of flow of said DC voltage signals.

2. A composite data transmission system according to claim 1, wherein said circuit switching station which has assumed the leadership of system timing hereinafter referrred to as "master station" sends out said DC voltage signals to the transmission line.

3. A composite data transmission system according to claim 2, wherein said master station, at the time that a time zone in which said packet switching station recognizes no collision hereinafter referred to as "packet switching area" ends and a time zone in which said packet switching station recognizes the presence of a collision hereinafter referred to as "circuit switching area" begins, starts watch on the presence of packets at a certain prescribed time in said packet switching area and, when no packet is present at that time, immediately sets one circuit switching area and, when a packet is present at that time, confirms termination of the transmission of said packet and thereafter sets said one circuit switching area after elapse of a prescribed duration.

4. A composite data transmission system according to claim 3, wherein said master station allocates channels for use in a circuit switching area by use of a packet switching area prior to the use of said circuit switching area.

5. A composite data transmission system according to claim 4, wherein said master station controls the length of a circuit switching area by monitoring the use of the transmission line during a circuit switching area.

* * * * *